Figure 1:
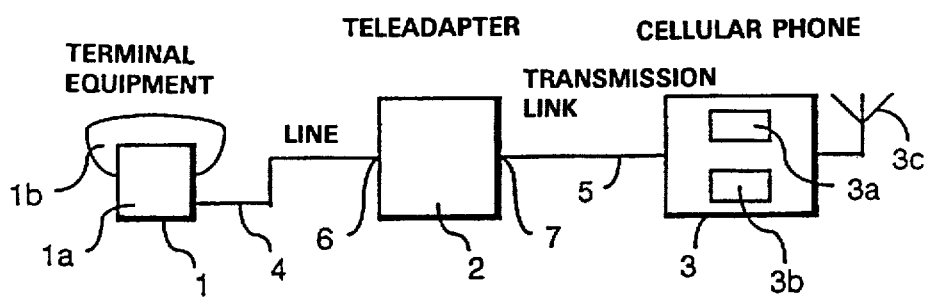

United States Patent [19]
Ala-Mursula et al.

[11] Patent Number: 5,722,087
[45] Date of Patent: Feb. 24, 1998

[54] METHOD FOR INTERPRETING DIALLED DIGITS OF A DIALLING SEQUENCE TRANSMITTED BY A DIALLING MEANS TO A RADIO TRANSCEIVER

[75] Inventors: Juha Ala-Mursula; Jukka Berg, both of Oulu, Finland

[73] Assignee: NE-Products Oy, Finland

[21] Appl. No.: 417,929

[22] Filed: Apr. 6, 1995

[30] Foreign Application Priority Data

Apr. 13, 1994 [FI] Finland .................................. 941714

[51] Int. Cl.$^6$ .................................................. H04Q 7/38
[52] U.S. Cl. .................................. 455/564; 455/550
[58] Field of Search .............................. 379/58, 59, 63, 379/31, 34, 199, 200, 216, 355; 455/33.1, 564, 565, 550, 414

[56] References Cited

U.S. PATENT DOCUMENTS

| | | | |
|---|---|---|---|
| 4,775,997 | 10/1988 | West, Jr. et al. | 379/58 |
| 4,870,686 | 9/1989 | Gerson et al. | 379/355 X |
| 4,959,851 | 9/1990 | Tobolski, Jr. et al. | 379/59 |
| 5,247,565 | 9/1993 | Joglekar et al. | 379/58 |
| 5,535,260 | 7/1996 | Zicker et al. | 379/63 |

FOREIGN PATENT DOCUMENTS 9014729 of 0000 WIPO.

*Primary Examiner*—Dwayne Bost
*Assistant Examiner*—William G. Trost
*Attorney, Agent, or Firm*—Ladas & Parry

[57] ABSTRACT

A method for interpreting digits of a sequence transmitted to a radio transceiver receives at least first, second and third digits of a sequence having at least first and second intervals respectively between the digits, waits for a new digit after receiving the third digit for a waiting time, interprets the digits at an end of the waiting time, and thereafter gives a command for a radio transceiver to transmit the digits. The waiting time is determined during the sequence from at least one characteristic of each of the intervals.

13 Claims, 3 Drawing Sheets

METHOD FOR INTERPRETING DIALLED DIGITS OF A DIALLING SEQUENCE TRANSMITTED BY A DIALLING MEANS TO A RADIO TRANSCEIVER

The invention relates to a method for interpreting dialled digits of a dialling sequence transmitted by a dialling means to a radio transceiver, said method comprising receiving dialled digits of a dialling sequence, dialled by a digit dialling means, sign dialling means or the like, and waiting for a possible new dialled digit after the last received dialled digit for a specific waiting time before all dialled digits of the dialling sequence are interpreted as received and before the method gives a transmission command to a radio transceiver which will set up the radio connection on the basis of the dialling sequence.

The present method can be used for several different applications. Basically, the present method has been developed for use in connection with teleadapters. A teleadapter is an adapter provided between a terminal equipment and a radio transceiver for adapting the user interface and electric interface of the radio transceiver to the properties of a two-wire subscriber connection in a fixed telephone network. In order to be able to perform such adaption, the teleadapter comprises interface circuits, which for instance generate a dialling tone towards the terminal equipment, generate a ringing voltage, indicate whether the terminal equipment is busy, and adjust the levels of audio signals. These interface circuits constitute means for connecting a terminal equipment and a radio transceiver to each other. With the radio transceiver, the teleadapter thus allows a call to be placed through a connection on a radio path by a normal terminal equipment of a fixed network, such as a DTMF (Dual-Tone Multi-Frequency) or a pulse dialled telephone, telefax or modem. The adapter can be used, for example, to allow a terminal equipment to provide services offered by a two-wire connection for buildings where there are no fixed telephones on account of its location, because it is under construction, owing to a natural catastrophe, or for some other reason. The radio transceiver may consist of the radio unit of a conventional cellular phone. The most essential advantage of the use of a teleadapter is that, with a radio transceiver, it can replace a missing connection of a fixed network with a radio path connection. The need to replace a connection of a fixed network is particularly pressing on an area in which it is not financially profitable or otherwise possible, for one reason or another, to build or expand a fixed network. The user does not notice any difference regardless of whether he uses a fixed telephone network or a solution implemented by a radio transceiver.

A teleadapter can also be used for connecting a normal cellular phone to a modem located in, for example, a portable microcomputer: the teleadapter allows data to be transmitted through a conventional cellular phone completely independently of the fixed telephone network.

As regards the teleadapter and the method for interpreting dialled digits of a dialling sequence transmitted by a dialling means to a radio transceiver, the problem is the interpretation of the last digit of the dialling sequence, because only the person who performs the dialling knows when he entered the last digit of the sequence. Even this person does not necessarily know when the last digit was dialled, since the dialling sequence may be entered from an intercom dialling memory location contained in the terminal equipment. It is important to detect the last digit of the dialling sequence, as, in order to avoid a time delay, a telephone message consisting of a dialling sequence should be transmitted over a bus to the radio transceiver as soon as possible once the entire dialling sequence, i.e. all the dialled digits, has been entered.

The problem described above can be avoided by entering a special character after the last digit of the dialling sequence. The teleadapter interprets this special character as a transmission command by which the telephone message consisting of the dialling sequence is sent through the bus to the radio transceiver for further transmission. This special character is usually #. However, it is not desirable to use an extra end mark of this kind, as an average user assumes that call establishment can succeed merely by dialling a sequence of digits without the user having to enter a special character at the end of the dialling sequence.

A known method developed to solve the above-mentioned problem utilizes a waiting time of constant length. The method awaits the dialling of a possible following digit for this waiting time before the method itself gives the transmission command to the radio transceiver which will set up the radio connection on the basis of the dialling sequence. In a known teleadapter and a method associated with it, the waiting time of constant length is 5 seconds. Nevertheless, a method wherein a waiting time of constant length is utilized is extremely inflexible, and it does not take differences between users or dialling sequences into account in any way. In the case of a sequence with six digits, for example, a person A may be capable of dialling all the digits at intervals of one second, for example, whereas another person B may perform the dialling so that the time interval between the dialling of the different digits may vary from 1 to 7 seconds. The reason for this may be that the number is familiar to person A and/or he is able to dial all the digits in succession without having to check the number from the telephone directory in between. The number may be completely unfamiliar to person B and/or he may have to check the number from the telephone directory in the middle of dialling the digit sequence. Person B may also differ from person A in his age, health or perception. In the case of person A, the waiting time of constant length, used in the known method, is clearly too long, since the transmission command is not given until after 5 seconds. In the case of person B, the waiting time of constant length, used in the known method, is clearly too short, as the transmission command is already given after 5 seconds; this is too soon, as another digit would still have been added to the dialling sequence 7 seconds after the preceding digit. Thus, in the case of person B, the call establishment would not have succeeded.

The method utilizing a waiting time of constant length has yet another significant drawback, which becomes apparent when the digit sequence is dialled from an intercom dialling memory location of a terminal equipment. When a digit sequence is dialled from an intercom dialling memory location, the time intervals between the dialled digits of the sequence are obviously short and of equal length. The known method is not able to detect this, and therefore even in the case of digits dialled automatically, e.g. from an intercom dialling memory location, the method must wait until the waiting time of constant length, i.e. 5 seconds, has come to an end before the telephone message consisting of the dialling sequence can be transmitted to the radio transceiver.

The teleadapter described above is not the only application with problems in the detection of the last digit of a dialling sequence and in the generation of a transmission command. This problem is also associated with cellular phones, as even with complete cellular phones it is necessary to press a transmission key after the last digit of a dialling sequence, whereafter the telephone message according to the dialling sequence is sent to the radio transceiver of the cellular phone, and a call is set up. As stated above in connection with a separate teleadapter, it is not desirable to use such an end mark; it would be easier for the user if a call could be set up merely by dialling a sequence of digits without the user having to enter any special character at the end of the dialling sequence. Even cellular phones require a teleadapter of some kind to adapt the radio transceiver of the cellular phone to the dialling means, earpiece and microphone. In such an application, the teleadapter would not necessarily be a separate element as stated above, but it would preferably be an integral part of the cellular phone. As regards the present invention, it must be pointed out that the term teleadapter is to be understood widely so that its function and the elements included in it may vary depending on the application in which it is used. In the last-mentioned application, the teleadapter does not have to comprise means for generating a ringing voltage or a dialling tone, as the cellular phone is not connected to a two-wire interface.

Another known method is number analysis. In number analysis, the dialling sequence, or the telephone number, dialled by the user is analyzed; if it is detected that the dialled number is, for instance, an emergency number, the number is transmitted immediately. A disadvantage of this method is, for example, that different countries have different emergency numbers and that it is applicable only with certain numbers.

The object of the present invention is to provide a new type of method by which the problems associated with the known solutions can be avoided.

This is achieved with the method of the invention, which is characterized in that the waiting time differs from a constant time, but is determined during the dialling sequence, that the method comprises determining one or more characteristics describing the intervals between the digits of the dialling sequence dialled so far, that the waiting time is determined on the basis of said one or more characteristics, and that said one or more characteristics and the waiting time are determined several times during the same dialling sequence as the dialling of the digits proceeds.

The method of the invention has several advantages. In the method of the invention, the waiting time is dependent on how a user performs the dialling of a digit sequence. If the user dials the digits of the sequence in such a way that the time intervals between the dialled digits are short, the waiting time is short, too; the transmission command relating to the telephone message consisting of the dialling sequence can be given sooner, and thus also the call establishment can be started after only a short while. Correspondingly, in the case of a user who dials the digits of a dialling sequence at long intervals, the waiting time is extended to prevent the dialling from being interrupted by a transmission command transmitted too soon. The solution of the invention allows the waiting time to be adapted to different people and different dialling sequences. Certain types of numbers are obviously easier to dial than others. It is also obvious that a familiar number is dialled at shorter and more even intervals than any unfamiliar number. A special advantage of the present method is that it allows dialling sequences entered by automatic dialling to be transmitted more rapidly. Technically, the present method is easy to implement. The devices needed for carrying out the method can be provided as part of a separate teleadapter, or they can be integrated into a cellular phone. The devices for carrying out the method of the invention have the same advantages as the method. The new method is a rapid method of analysis.

Figure 3:
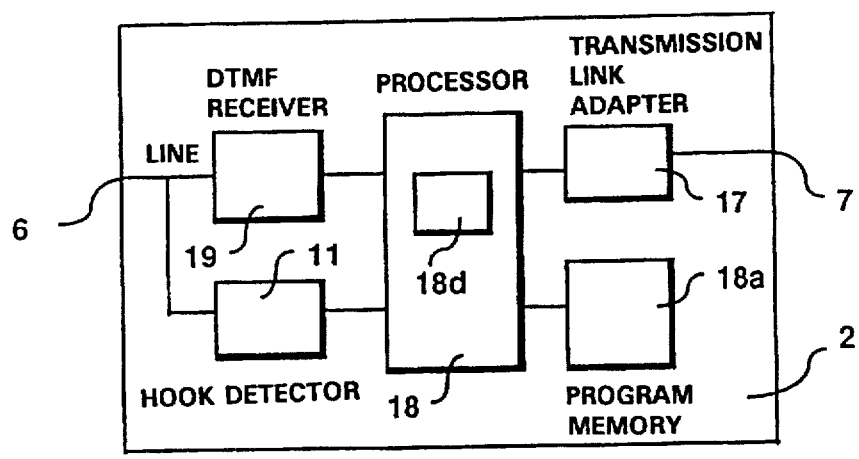
Figure 4:
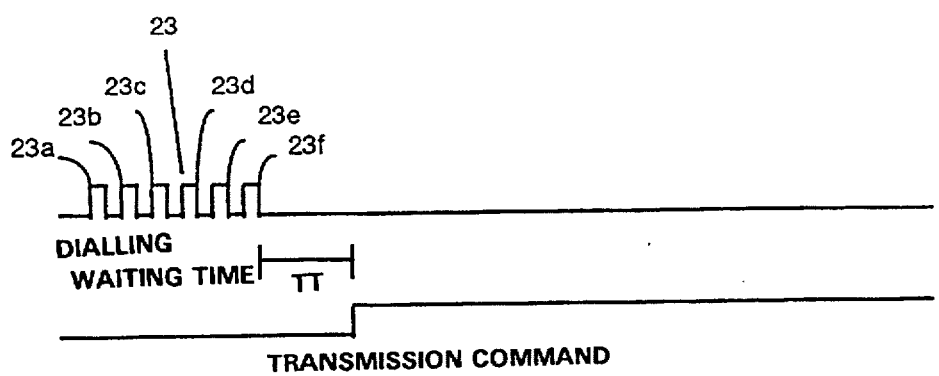
Figure 2:
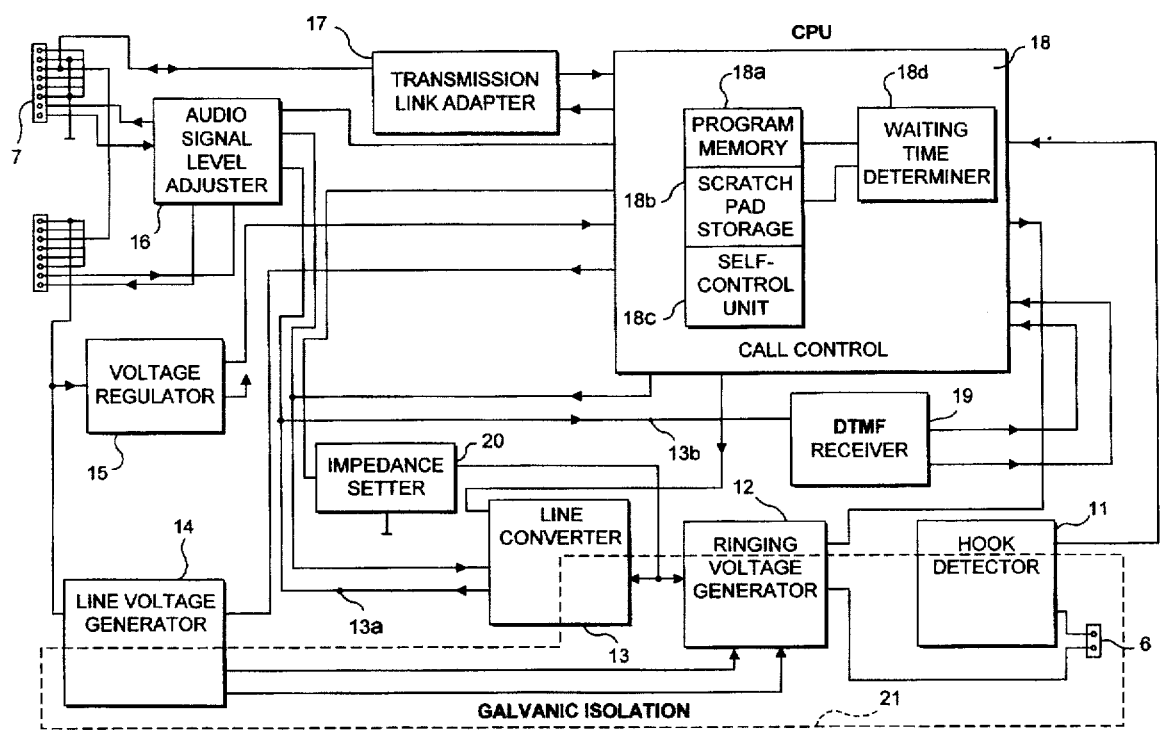
Figure 5:
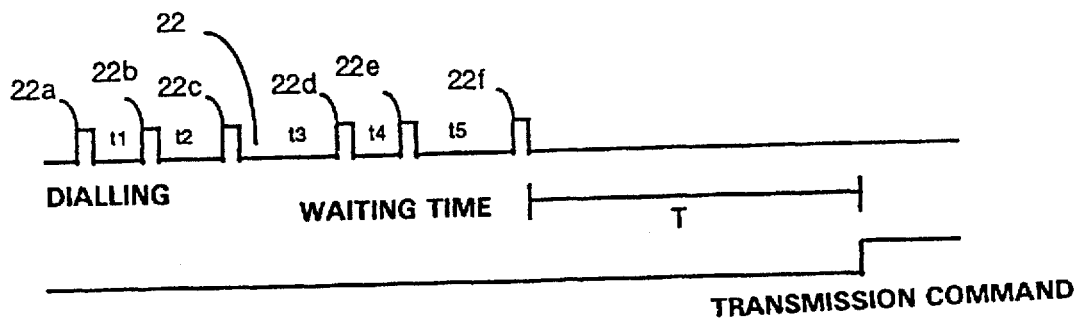
Figure 6:
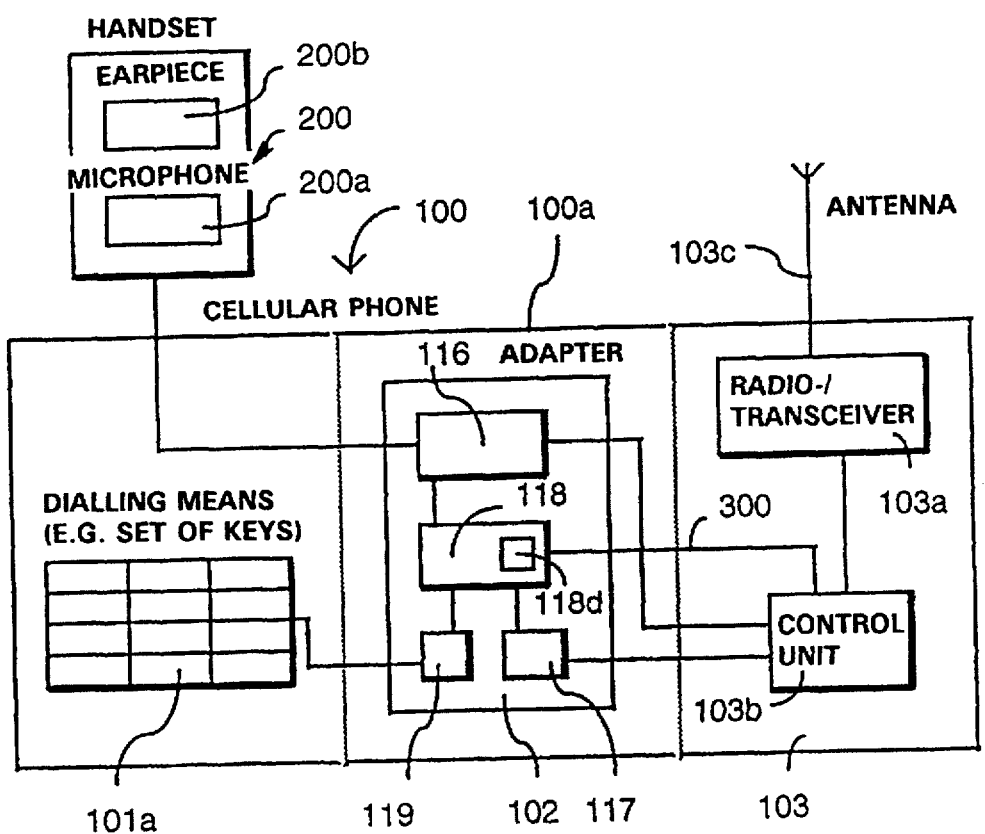

In the following, the invention will be described in greater detail with reference to the accompanying drawings, in which FIG. 1 shows a first embodiment of the method according to the invention, integrated into a separate teleadapter, FIG. 2 is a switching diagram of the teleadapter shown in FIG. 1, FIG. 3 is a simplified block diagram of the teleadapter shown in FIGS. 1 and 2, FIG. 4 is a time diagram of a digit sequence entered by automatic dialling, of the subsequent waiting time, and of the transmission command given after the last dialled digit, FIG. 5 is a time diagram of a dialling sequence entered by a user, of the subsequent waiting time, and of the transmission command given after the last dialled digit, FIG. 6 shows a second embodiment of the method according to the invention, integrated into a cellular phone.

At first, the use and the teleadapter or the like of the first embodiment of the invention will be described with reference to FIGS. 1 to 3. FIG. 1 shows a terminal equipment 1, a teleadapter 2, and a radio transceiver 3, which may be a conventional cellular phone without a user equipment connected to a user interface. The terminal equipment 1, in turn, may be a DTMF (Dual-Tone Multi-Frequency) or a pulse dialled telephone, telefax or modem. In the example of FIG. 1, the terminal equipment 1 is a dual-tone telephone device comprising a dialling means 1a, such as a set of keys 1a, and a handset 1b. The terminal equipment 1 is connected to the teleadapter over a two-wire connection 4. The radio transceiver 3 is connected to the teleadapter 2 over a transmission link 5, such as a bus. The transmission link 5 comprises a data bus and audio lines. The transmission link 5 may be either serial or parallel. In practice, the structures illustrated in FIG. 1 may be located so that the terminal equipment 1 is connected to the two-wire interface 6 of the teleadapter 2, and said two-wire interface 6, in turn, is connected to the radio transceiver 3 located in the same space. The radio transceiver comprises a radio transceiver unit 3a, a control unit 3b and an antenna 3c.

The function of the teleadapter shown in FIG. 1 is to adapt the user interface and electric interface of the radio transceiver 3 to the properties of a two-wire subscriber connection in a fixed telephone network; in other words, the aim is to adapt a normal terminal equipment 1 and a radio transceiver 3 which replaces a connection of the fixed network to each other.

FIGS. 2 and 3 are diagrams illustrating the internal operation of the teleadapter. The teleadapter 2 comprises a two-wire interface 6 or a corresponding interface to a terminal equipment 1, and an interface 7 to a radio transceiver 3. The terminal equipment 1 is thus connected to the interface 6 by a two-wire connection 4, and the radio transceiver 3 is connected to the interface 7 by a bus cable 5 or another transmission line.

The actual parts of the teleadapter 2 can be enumerated as follows:

HOOK detector block 11, which identifies whether the terminal equipment 1 is busy or idle, i.e. whether the handset 1b of the terminal equipment is off the hook or not. The block 11 may also be used for identifying the dialling sequence entered by a pulse-dialled terminal equipment.

A ringing voltage generator 12, which generates a ringing voltage to the terminal equipment 1 when the terminal equipment 1 is about to receive a call through the radio transceiver 3 and the teleadapter 2.

A line converter 13, which connects the outgoing and incoming audiosignal to the same line. The line converter 13 is a 2-4 converter, which allows a bidirectional audio signal to propagate along a two-wire connection 4.

A line voltage generator 14, which generates a line voltage, e.g. a DC voltage of 48 V or 60 V. The line voltage is needed to generate a line current by which it is possible to provide a closed connection loop corresponding to the busy state of the telephone, i.e. to the OFF-HOOK state when the handset is lifted.

A voltage regulation block 15. A voltage of 12 V is obtained from a battery or some other power source. The voltage of 12 V is supplied to the block 15, which generates from this voltage a logic voltage of 5 V, required by a control unit 18, such as a central processing unit (CPU), included in the teleadapter.

An audio level adjustment block 16. First, the block 16 adapts to the radio transceiver 3 the audio signals received from the terminal equipment 1 through the telephone line, i.e. the two-wire connection, and the two-wire interface 6. Second, the block 16 adapts the audio signals received from the radio transceiver 3 to the terminal equipment 1. The block 16 adjusts the levels of the audio signals. This kind of adjustment is needed, because the models of different manufacturers and even different models of the same manufacturer differ from each other as to the level of the audio signal that allows the most efficient use of the radio channels.

Transmission link adapter block 17, which consists of a bus adapter if the transmission link 5 from the teleadapter 2 to the radio transceiver 3 is a bus. The block 17 transfers message communications from the teleadapter 2 through the interface 7 to the radio transceiver 3. The block 17 converts the serial data received from the TX output of the control unit 18 into a suitable form, and sends the data further to the radio transceiver 3 through the transmission link 5. Correspondingly in the opposite direction, the block 17 converts data transmitted to it from the radio transceiver 3 through the transmission link 5 and the interface 7 into serial form, whereafter the data can be supplied to the RX input of the control unit 18.

A control block 18, which controls the operation of the teleadapter 2. The block 18 comprises a program memory 18a, a scratch pad storage 18b, and a self-control unit 18c. The most significant part for the present invention is block 18d, which is the block for determining the waiting time T. The control block 18 generates the main part of the control operations needed by the teleadapter 2. An example of the control operations given by the control block 18 is the CALL CONTROL output, which instructs the block 12 to generate a ringing voltage, when a call is coming from the radio transceiver 3. Another example of the control operations given by the block 18 is the output indicated as 425 Hz. This output generates an idle/busy tone to the audio line 4 when the handset is lifted off the hook for placing/answering a call.

A DTMF receiver 19. The block 19 receives a dialling sequence, or digit sequence, from the dialling means 1a, i.e. digit dialling means 1b such as a set of keys, of a terminal equipment 1. The block 19 decodes the DTMF dialling sequence, and converts it into a form compatible with the control unit 18.

A line impedance setting block 20, which is needed, as terminal equipments in different countries have different impedance responses. The block 20 allows the impedance level to be adjusted specifically for each country.

In FIG. 2, the thicker line 21 defines galvanic isolation, which is used to prevent disturbance voltages from propagating from the terminal equipment to the radio transceiver and vice versa. The teleadapter can also be implemented without galvanic isolation.

The present invention actually relates to a method for interpreting dialled digits of a dialling sequence transmitted by a dialling means 1a, such as the set of keys of a terminal equipment 1, to the radio transceiver 3. A dialling sequence entered by a user is illustrated in FIG. 5 by the uppermost time diagram 22, which represents a DTMF pulse line 22 in which each pulse 22a–22f represents a single digit of the dialling sequence. The dialling sequence 22 shown in FIG. 5 comprises thus six digits 22a–22f entered by a user by the set of keys 1a of a terminal equipment 1.

The method comprises receiving dialled digits 22a–22f included in a dialling sequence 22 and entered by a digit dialling means 1a one at a time. After the last received dialled digit, a possible new dialled digit is awaited for a specific waiting time T until all dialled digits 22a–22f are interpreted as received, and until a transmission command is given to the radio transceiver 3 which will set up the radio connection on the basis of the dialling sequence 22. The waiting time is determined in the control block 18, more specifically its block 18d. If the terminal equipment is a DTMF terminal equipment, the dialled digits 22a–22f thus propagate one at a time from the set of keys 1a of the terminal equipment 1 to the two-wire interface 6, to block 12 and block 13, to signal path 13a and signal path 13b, and further to the DTMF receiver 19, from which each single dialled digit, e.g. digit 22a, propagates to the DTMF data input of the control unit 18, and further to the block 18d where the waiting time T is determined.

In the method according to the invention, the waiting time T differs from a constant time, i.e. is not of constant length, but is determined during the dialling sequence 22. Block 18d determines one or more characteristics illustrating the intervals between those digits of the dialling sequence 22 which have been dialled so far. The waiting time T is determined on the basis of said one or more characteristics several times during the same dialling sequence 22 as the dialling of the digits 22a–22f of the sequence 22 proceeds.

In FIG. 5, the time intervals between the dialled digits 22a–22b, 22b–22c, 22c–22d, 22d–22e and 22e–22f of the dialling sequence are indicated by references t1 to t5. A dialling sequence 22 of six digits thus comprises five intervals t1–t5 between the digits 22a–22f.

According to a preferred embodiment of the method, said one or more characteristics used for determining the waiting time T are obtained by defining the number N of the digits dialled so far, and the intervals between them. If a user has dialled only the first digit, the number N of dialled digits is 1, and the waiting time T has a calculated value or an initial value determined in some other way. Correspondingly, if the user has dialled, for example, the first four digits 22a–22d, the number N of dialled digits is 4, and the waiting time is determined on the basis of one or more characteristics determined on the basis of the three intervals t1, t2 and t3 between the first four digits.

According to a preferred embodiment, the characteristic used for determining the waiting time T is the average X of the time intervals between the digits dialled so far, or a corresponding characteristic. For determining the waiting time T, the method utilizes a factor f(X) which is dependent on the average of the intervals between the dialled digits, or a corresponding characteristic X. In the simplest solution, the factor f(X) may be directly of the form f(X)=X, but in the most preferred embodiment, the function f(X) allows a suitable range of variation for the waiting time.

In a preferred embodiment, the characteristic used for determining the waiting time T is the standard deviation S of the intervals between the digits dialled so far, or a corresponding deviation characteristic. For determining the waiting time T, the method utilizes a factor f(S) which is dependent on the standard deviation of the intervals between the dialled digits, or a corresponding deviation characteristic.

Most preferably, both the average X and the standard deviation S are used for determining the waiting time T. In this case, T=f(X, S)=K*f(X)*f(S), wherein K is a constant (i.e., the waiting time is directly proportional to the factor). Factor f(X), dependent on the average X, and factor f(S), dependent on the standard deviation S, allow a different value to be determined for the waiting time T in different situations. What is meant by different situations is that the intervals between the dialled digits may be short in some dialling sequences and long in others, and the standard deviation of the intervals between the dialled digits may be small in some dialling sequences and great in others.

In the method of the invention, if a new dialled digit 22d is received after, for example, the third dialled digit 22c before the waiting time has come to an end, the interval between the new dialled digit and the preceding dialled digit is taken into account when the waiting time is determined again. The method of the invention thus monitors the dialling continuously and adapts itself continuously depending on how the user or automatic dialling performs the dialling.

In FIGS. 4 and 5, the waiting time T is the waiting time calculated after the last dialled digit 22f. However, the method comprises calculating a new waiting time after each dialled digit, taking into account the intervals between the digits dialled so far; a characteristic is calculated on the basis of these intervals, and the waiting time T is determined on the basis of this characteristic. In the case of a dialling sequence with six digits, the waiting time T is thus determined six times. However, in a preferred embodiment, the calculation of characteristics/determination of the waiting time is started only after two digits, as it is not possible to calculate the first average until then. The waiting time T is therefore determined five times in the case of a telephone number with six digits.

The number of times the waiting time is determined is thus the same as the number of the dialled digits 22a–22f of the dialling sequence 22.

The object of the method of the invention is to adapt the waiting time T according to how the digits 22a–22f are dialled. Therefore, when the average X of the intervals t1 . . . between the dialled digits, or a corresponding characteristic, grows, the waiting time T is extended. Correspondingly, when the standard deviation S of the intervals t1 . . . between the dialled digits, or a corresponding characteristic, grows, the waiting time T is extended.

In a preferred embodiment, the intervals t1 t2 between the digits dialled at the beginning of the dialling sequence, e.g. between the first three dialled digits 22a, 22b, 22c, are emphasized less than the intervals t3, t4, t5 between the digits 22c, 22d, 22e, 22f dialled later. This procedure is required, as it can be assumed that the area code (three first digits) occurring at the beginning of the dialling sequence can be dialled more rapidly and at more even intervals than the actual subscriber number. The digits dialled at the beginning of the sequence should therefore be considered less significant in order to prevent the determination of the waiting time T from being distorted.

In a preferred embodiment, the method comprises determining the waiting time T in such a way that the determination is free of the use of a fixed minimum waiting time, i.e. no fixed minimum waiting time is used. Likewise, no fixed maximum waiting time is used in the determination of the waiting time. According to this embodiment, the waiting time T is determined in such a manner that the method avoids any problems which might occur if fixed time limits were used.

The following is a description of the use of the method for interpreting a dialling sequence 22 according to FIG. 5. A user dials the first digit 22a by a dialling means 1a of a terminal equipment 1, the dialled digit is received at block 9, and further at a control unit 18, and block 18d contained in it, i.e. the block for determining the waiting time for the following digit. As this is the first dialled digit, no time interval between digits exists yet. At any rate, the function T=K*f(X)*f(S) gives a certain value T1, which is set as the waiting time for the following dialled digit 22b. The interval t1 is shorter than the waiting time T1, wherefore the following dialled digit 22b is received (dialled by the user) before the waiting time T1 comes to an end. After receiving dialled digit 22b, block 18d detects that the user has now dialled two digits. Then block 18d determines the interval t1 between the first two digits 22a, 22b. As no other intervals than interval t1 can be used in the determination of the waiting time, the average obtained by calculation in block 18d is time t1 and the standard deviation is 0. On the basis of these characteristics, block 18d determines a new waiting time T2 for the following dialled digit 22c. The interval t2 is shorter than the waiting time T2, wherefore the following dialled digit 22c is received (dialled by the user) before the waiting time T2 comes to an end.

After receiving dialled digit 22c, block 18d detects that the user has now dialled three digits. Block 18d then determines the interval t2 between the second and the third dialled digit 22b, 22c. As time intervals t1 and t2 can be used for determining the waiting time, the average X obtained by calculation in block 18d is the time (t1+t2)/2, and the standard deviation is a certain value S, which is the standard deviation of intervals t1 and t2. On the basis of these characteristics X and S, block 18d determines a new waiting time T3 for the following dialled digit 22d. The interval t3 is shorter than the waiting time T3, wherefore the following dialled digit 22d is received (dialled by the user) before the waiting time T3 comes to an end.

After receiving dialled digit 22d, block 18d detects that the user has now dialled four digits. Block 18d then determines the interval t3 between the third and the fourth dialled digit 22c, 22d. As time intervals t1 t2 and t3 can be used for determining the waiting time, the average X obtained by calculation in block 18d is the time (t1+t2+t3)/3, and the standard deviation is a certain value S, which is the standard deviation of intervals t1 t2 and t3. On the basis of these characteristics X and S, block 18d determines a new waiting time T4 for the following dialled digit 22e. The interval t4 is shorter than the waiting time T4, wherefore the following dialled digit 22e is received (dialled by the user) before the waiting time T4 comes to an end.

After receiving dialled digit 22e, block 18d detects that the user has now dialled five digits. Block 18d then determines the interval t4 between the fourth and the fifth dialled digit 22d, 22e. As time intervals t1 t2, t3 and t4 can be used for determining the waiting time, the average X obtained by calculation in block 18d is the time (t1+t2+t3+t4)/4, and the standard deviation is a certain value S, which is the standard deviation of intervals t1 t2, t3 and t4. On the basis of these characteristics X and S, block 18d determines a new waiting time T5 for the following dialled digit 22f. The interval t5 is shorter than the waiting time T5, wherefore the following dialled digit 22f is received (dialled by the user) before the waiting time T5 comes to an end.

After receiving dialled digit 22f, block 18d detects that the user has now dialled six digits. Block 18d then determines the interval t5 between the fifth and the sixth dialled digit 22e, 22f. As time intervals t1 t2, t3, t4 and t5 can be used for determining the waiting time, the average X obtained by calculation in block 18d is the time (t1+t2+t3+t4+t5)/5, and the standard deviation is a certain value S, which is the standard deviation of intervals t1 t2, t3, t4 and t5. On the basis of these characteristics X and S, block 18d determines a new waiting time T for the following dialled digit.

However, the user has already dialled all the digits, wherefore no further dialled digits are received during the waiting time T. After the waiting time T, the method thus interprets that the last digit of the dialling sequence 22 has been received. As a result of this, the method generates a transmission command, by which the telephone message according to the dialling sequence is transmitted through block 17, interface 7 and bus 5 to the radio transceiver 3, which will then start to set up a connection to the telephone number indicated by the dialling sequence.

FIG. 4 is a time diagram of a dialling sequence 23 entered by automatic dialling, and the corresponding waiting time TT following the last dialled digit. In FIG. 4, the digits of the dialling sequence are indicated by references 23a to 23f. The dialling sequence 23 has perfectly even intervals, as it is entered by automatic dialling from an intercom dialling memory location of a terminal equipment 1. In principle, the dialling sequence of FIG. 4 is interpreted in the same way as dialling sequence 22 above. As the average interval X between the dialled digits of the dialling sequence 23 is short, and the standard deviation S=0, the waiting time TT after the sixth dialled digit 23f is quite short, as can be seen from FIG. 4, and thus the transmission command can be given soon after the last digit 23f.

In the embodiment illustrated in FIGS. 1 to 3, the radio transceiver 3 used in the method is a fixed or mobile cellular radio transceiver, and the dialling means 1b is contained in a terminal equipment 1 which is separate from the cellular radio transceiver. The separate terminal equipment 1 is connected to the cellular radio transceiver 3 through a teleadapter 2 or the like. The teleadapter 2 comprises means, such as blocks 12 to 20, for connecting the terminal equipment 1 and the cellular radio transceiver 3 to each other. Whether blocks 12 to 20 are needed depends on whether the case concerns connection to a two-wire connection.

FIG. 6 illustrates a second embodiment of the method according to the invention, integrated into a cellular phone 100. The cellular phone 100 comprises a case 100a with a dialling means 101a, such as a set of keys, and a handset 200 with a microphone 200a and an earpiece 200b. In addition, the cellular phone 100 comprises an adapter 102, and a radio transceiver 103 comprising a radio transceiver unit 103a, a control unit 103b and an antenna 103c. The adapter 102 comprises blocks 119, 118, 118d, 116 and 117, whose operation and function correspond to those of blocks 19, 18, 18d, 16 and 17 of the teleadapter 2 of FIG. 2, respectively. Block 119 is a means for receiving the dialled digits of the dialling sequence, block 118 is a control unit, block 118d is a means for determining the waiting time T, block 116 is a means for adjusting audio levels, and block 117 is a means for transmitting the telephone message formed by the dialling sequence to the radio transceiver 103.

The embodiment shown in FIG. 6 is not used for connecting a radio transceiver to a two-wire connection, wherefore the adapter 102 does not have to contain all the interface circuits, or adapting means, included in the teleadapter 2 of FIG. 2. The embodiment of FIG. 6 does not need, for instance, a ringing voltage generator or a HOOK detector block.

In the example illustrated in FIG. 6, the radio transceiver 3 used in the method is a radio transceiver of a fixed or a mobile cellular phone 100. The dialling means 101a is either contained in the cellular phone itself or connected to the data bus of the radio transceiver. In pay phones, for example, it is possible to use a dialling means connected to the data bus of the radio transceiver. The dialling means may be positioned in the handset or integrated into the case 100a.

The cellular phone shown in FIG. 6 may be, for example, a model intended for use as a wireless home terminal or a model intended for use as a pay phone. If the functions of the handset 200, i.e. the microphone and the earpiece, were also integrated into the case 100a, the phone would be a cellular phone of hand-portable type. As regards the method of the invention, the embodiment shown in FIG. 6 operates in the same way as the embodiment shown in FIGS. 1 to 3.

In a preferred embodiment, determination of the waiting time T is controlled by the same control unit 103b that is used for controlling the operation of the cellular phone 100. In FIG. 6, this is illustrated by control line 300, which connects the control unit 103b of the cellular phone to the control unit 118 of the adapter 102. This embodiment makes the arrangement more compact.

With respect to the term cellular phone, it must be stated that a cellular phone can be either fixed or mobile. A fixed cellular phone remains within the area of one cell in a base station network. Examples of such a fixed cellular phone are cellular phones positioned in a building or intended for use as pay phones. A mobile cellular phone may roam from one cell to another within a base station network. An example of a mobile cellular phone is a normal portable cellular phone or a cellular phone positioned in a train.

The function for determining the waiting time T is such that, according to the method of the invention, the waiting time is from 1 to 10 seconds, depending on how the telephone number is dialled.

Although the invention is described above with reference to the examples shown in the accompanying drawings, it will be obvious that the invention is not limited to these examples, but can be modified in many ways within the inventive concept disclosed in the appended claims.

We claim:

1. A method for interpreting entered digits of a dialling sequence transmitted by a dialling means to a radio transceiver, said method comprising receiving entered digits of a dialling sequence which are entered by a digit dialling means, and waiting for a possible new entered digit after the last received entered digit for a specific waiting time before all entered digits of the dialling sequence are interpreted as received and before a transmission command is given to a radio transceiver which sets up the radio connection on the basis of the dialling sequence, characterized in that the waiting time is not constant, but is determined during the dialling sequence, that the method comprises determining one or more characteristics describing the intervals between the digits of the dialling sequence as the entering of the digits proceeds, that the waiting time is determined on the basis of said one or more characteristics, and that said one or more characteristics and the waiting time are determined several times during the same dialling sequence as the entering of the digits proceeds.

2. A method according to claim 1, characterized in that in order to determine said one or more characteristics used for determining the waiting time, the method comprises determining the number of digits entered in the dialling sequence so far and the time intervals between the digits entered in the dialling sequence so far.

3. A method according to claim 1, characterized in that if a new entered digit is received after a preceding entered digit before the waiting time has come to an end, the interval between the last entered digit and the one preceding it is taken into account when the waiting time is determined again.

4. A method according to claim 1, characterized in that the number of times the waiting time is determined is approximately the same as the number of entered digits included in the dialling sequence.

5. A method according to claim 1, characterized in that the characteristic used for determining the waiting time is the average of the intervals between the entered digits or a corresponding characteristic, and that a factor dependent on the average of the intervals between the entered digits or the corresponding characteristic is used for determining the waiting time.

6. A method according to claim 5, characterized in that when the average of the intervals between the entered digits or the corresponding characteristic increased, the waiting time is extended.

7. A method according to claim 1, characterized in that the characteristic used for determining the waiting time is the standard deviation of the intervals between the entered digits or a corresponding deviation characteristic, and that a factor dependent on the standard deviation of the intervals between the entered digits or a corresponding deviation characteristic is used for determining the waiting time T.

8. A method according to claim 7, characterized in that when the standard deviation of the intervals between the dialled entered or the corresponding characteristic increases, the waiting time is extended.

9. A method according to claim 1, characterized in that when the waiting time is determined, time intervals between the digits being entered at the beginning of the dialling sequence are emphasized less than time intervals between digits entered later in the dialling sequence.

10. A method according to claim 1, characterized in that the determination of the waiting time is not set to a fixed minimum waiting time.

11. A method according to claim 1, characterized in that the determination of the waiting time is not set to a fixed maximum waiting time.

12. A method according to claim 1, characterized in that the radio transceiver used in the method is a fixed or mobile cellular radio transceiver, and the dialling means is contained in a terminal equipment which is separate from the cellular radio transceiver, said separate terminal equipment being connected to the cellular radio transceiver through a teleadapter or the like, said teleadapter comprising means for connecting the terminal equipment and the cellular radio transceiver to each other.

13. A method according to claim 1, characterized in that the radio transceiver used in the method is a radio transceiver of a fixed or a mobile cellular phone, and that the dialling means is either contained in the cellular phone itself or connected to the radio transceiver through a data bus or a corresponding link.

* * * * *